(No Model.) 6 Sheets—Sheet 4.

A. T. GIFFORD.
MAGAZINE ELECTRIC LAMP.

No. 271,059. Patented Jan. 23, 1883.

WITNESSES
W. B. Hale.
Phil. W. Hale.

INVENTOR
Alonza T. Gifford,
Fred W. Royce
By his Attorney, (No Model.) 6 Sheets—Sheet 5.
A. T. GIFFORD.
MAGAZINE ELECTRIC LAMP.
No. 271,059. Patented Jan. 23, 1883.
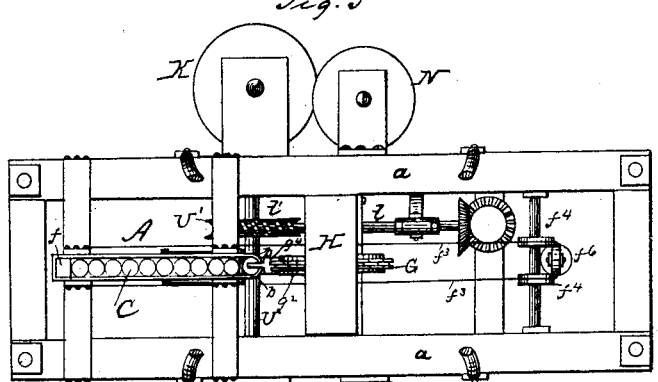
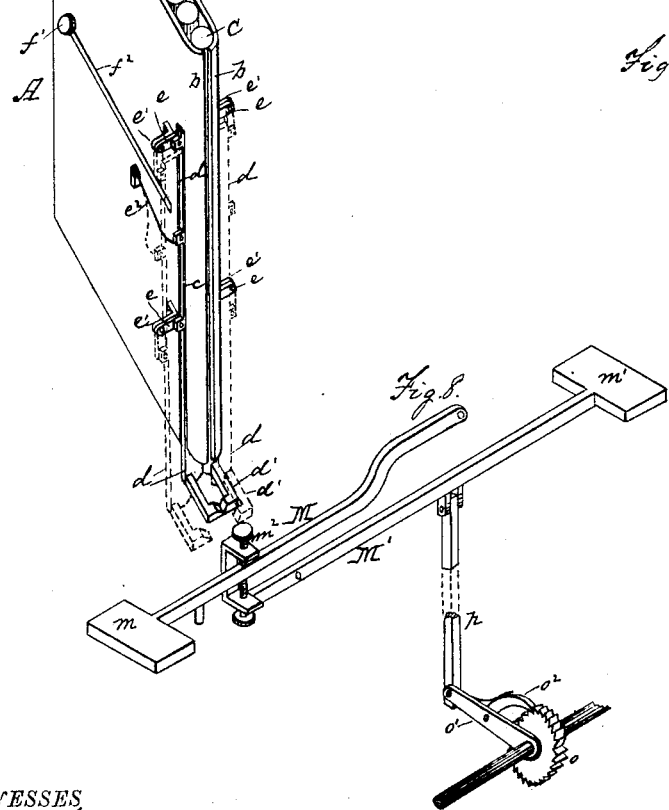
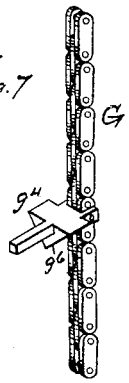
WITNESSES
W B Hale
Phil W. Hale
By his Attorney
INVENTOR
Alonzo T. Gifford,
Fred W. Royce (No Model.) 6 Sheets—Sheet 6.
A. T. GIFFORD.
MAGAZINE ELECTRIC LAMP.
No. 271,059. Patented Jan. 23, 1883.
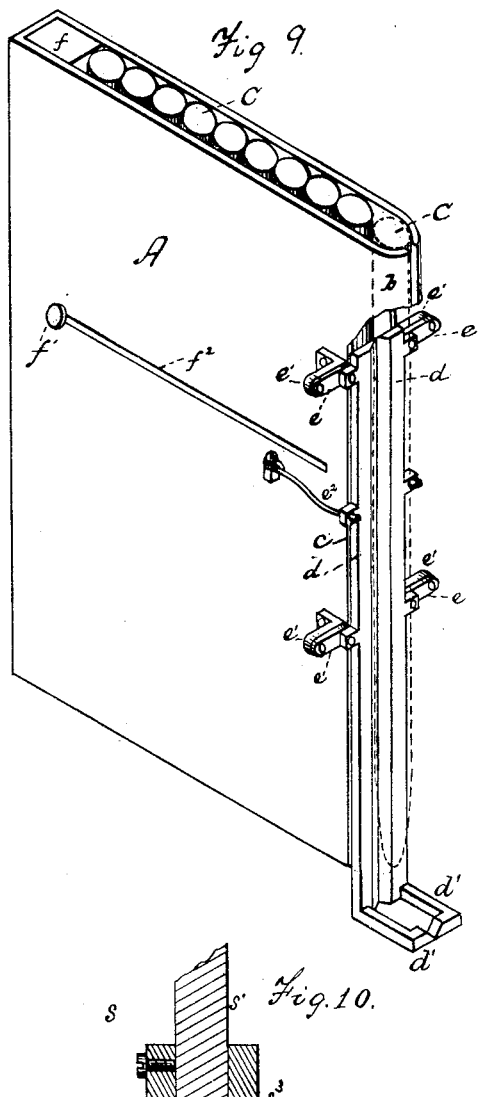
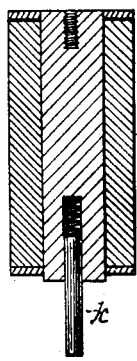
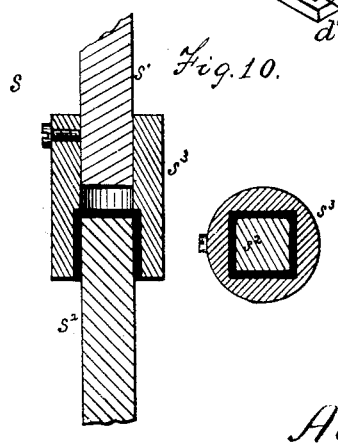
Witnesses,
W B Hale
Phil W Heale
Inventor,
Alenza T. Gifford,
by Fred W. Royce
Attorney

UNITED STATES PATENT OFFICE.

ALENZA T. GIFFORD, OF PROVIDENCE, RHODE ISLAND, ASSIGNOR TO ANDREW B. SEARLES, OF SAME PLACE.

MAGAZINE ELECTRIC LAMP.

SPECIFICATION forming part of Letters Patent No. 271,059, dated January 23, 1883.

Application filed January 12, 1882. (No model.)

*To all whom it may concern:*

Be it known that I, ALENZA T. GIFFORD, a citizen of the United States, residing at Providence, in the county of Providence and State of Rhode Island, have invented certain new and useful Improvements in Magazine Electric Lamps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to automatically supply fresh carbon pencils to replace those consumed by an electric lamp; and it consists in certain novel combinations of devices for this purpose, as will be hereinafter particularly described, and pointed out in the claims.

It also consists in certain improvements in the carbon-feed devices.

Figure 1:
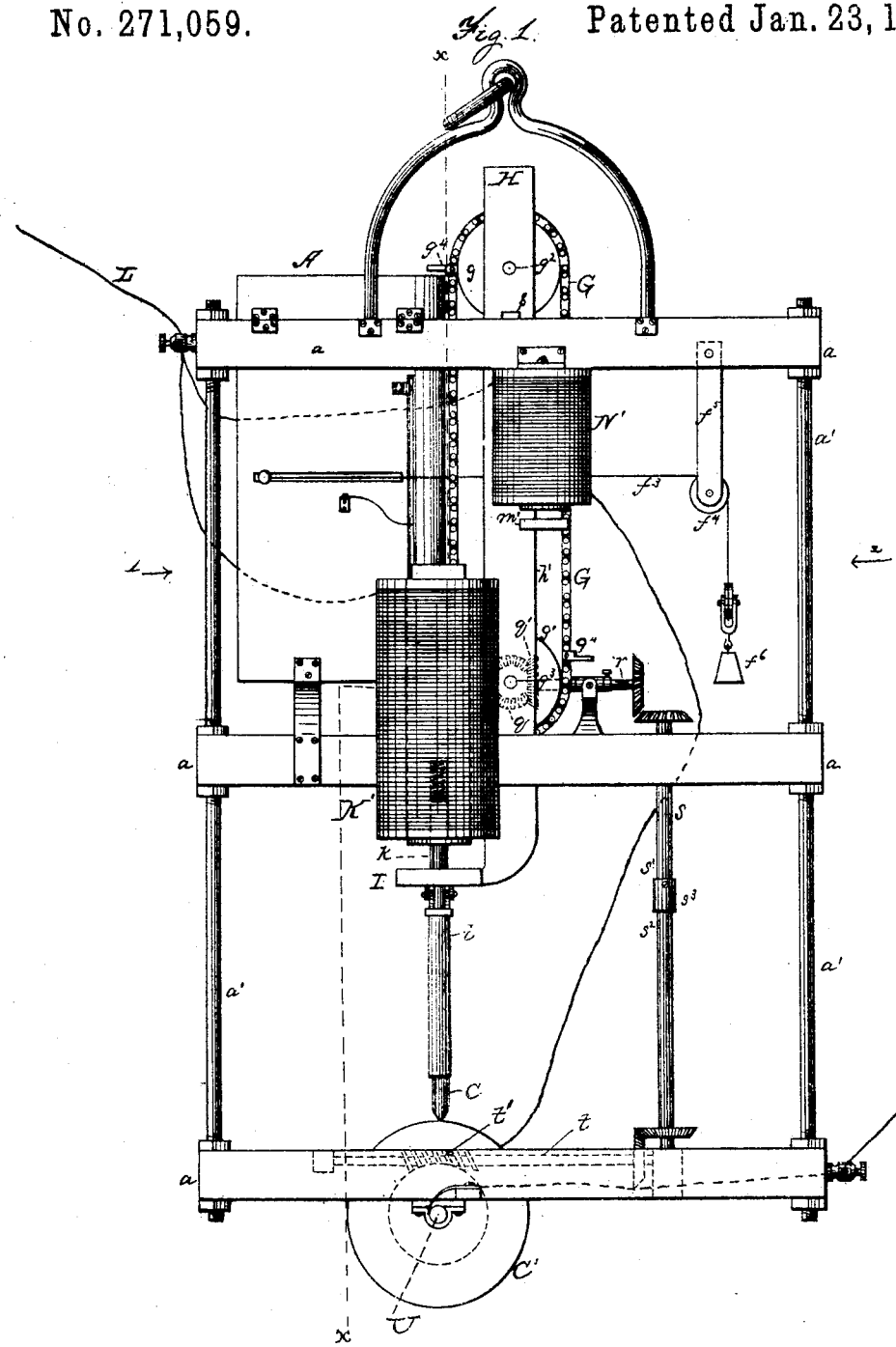
Figure 2:
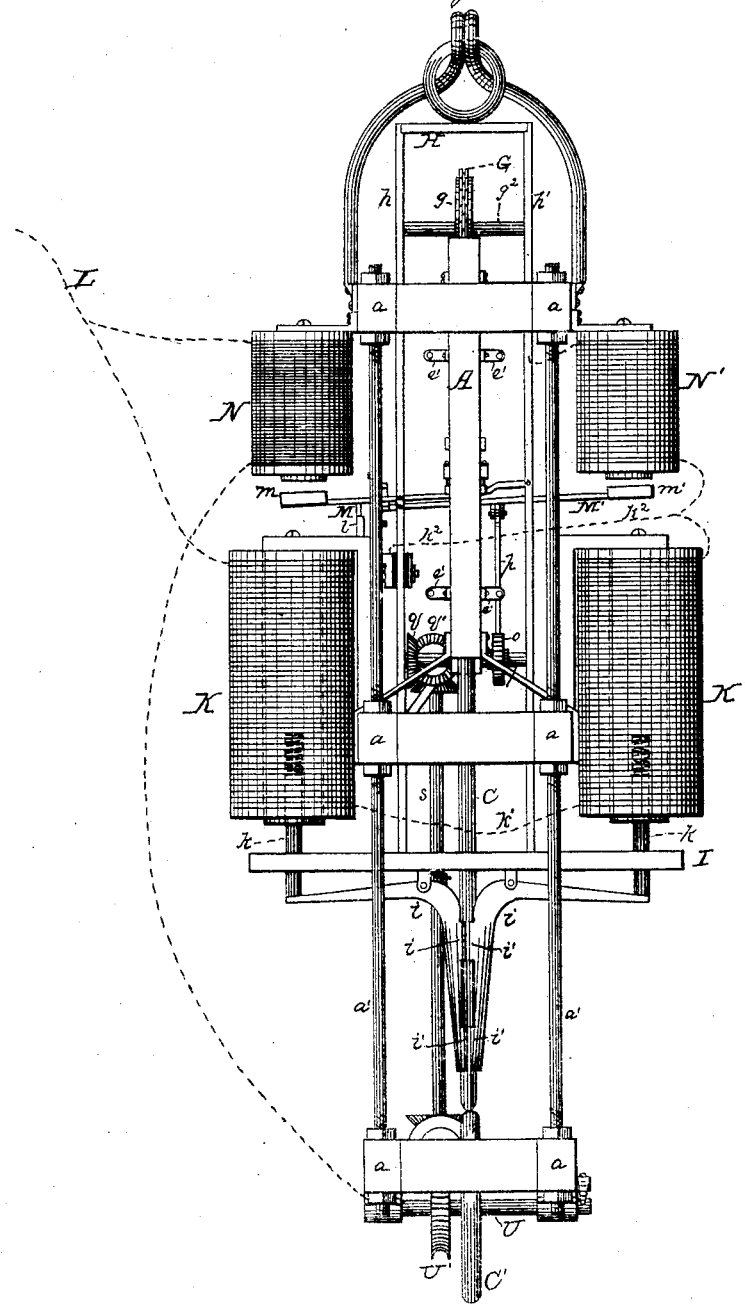
Figure 3:
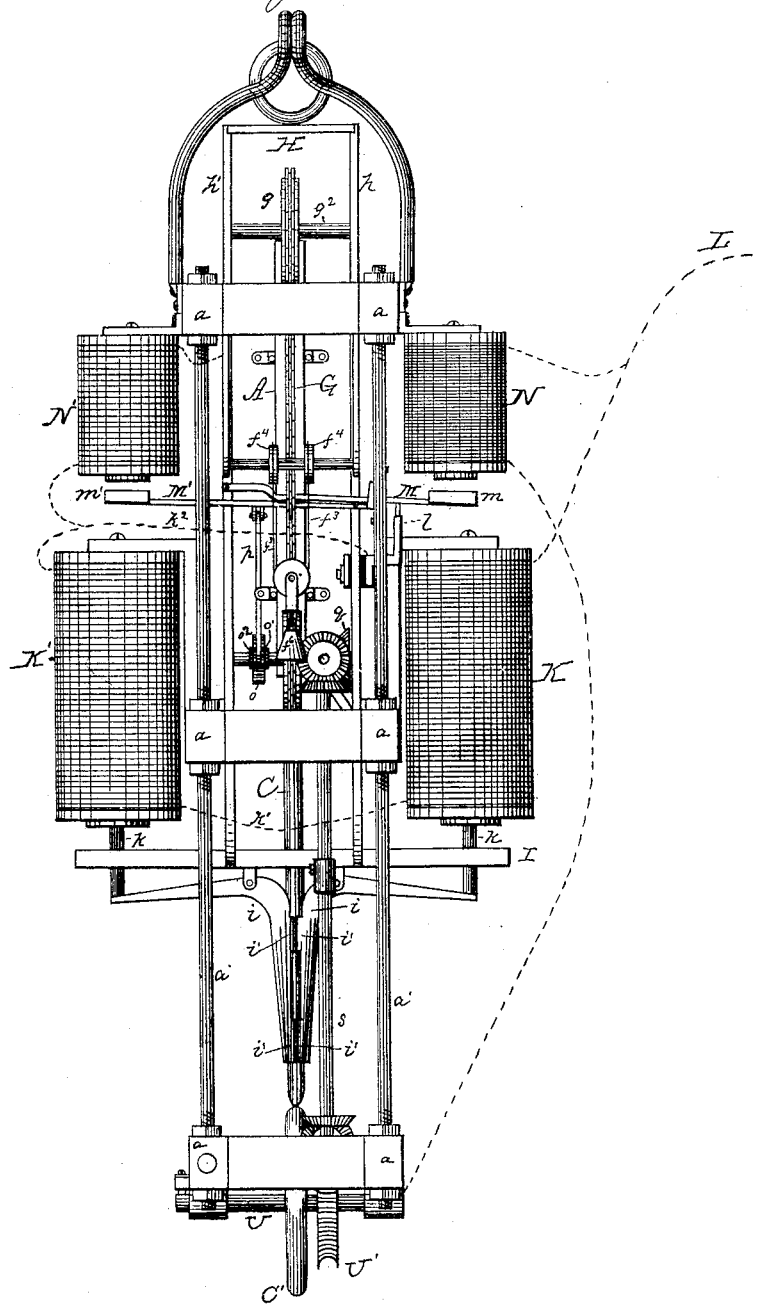
Figure 4:
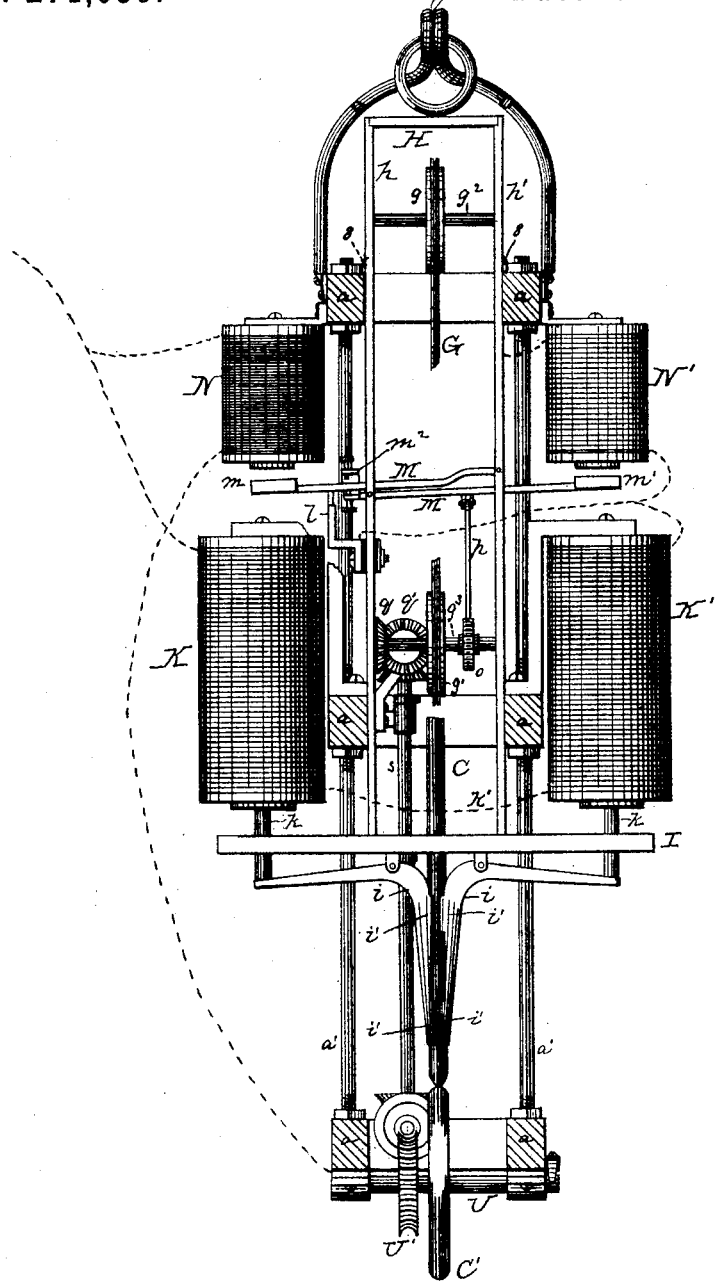

In the accompanying drawings, Figure 1 is a side view of my improved magazine electric lamp. Fig. 2 is an end view of the same, looking in the direction indicated by the arrow No. 1. Fig. 3 is an end view, looking in the direction of arrow No. 2. Fig. 4 is a partial vertical section on line $x\ x$ of Fig. 1. Fig. 5 is a top view. Fig. 6 is a perspective view of the magazine detached. Fig. 7 is a perspective view of a portion of the feeding-chain with one of its projecting lugs. Fig. 8 is a detached perspective view of the balanced levers and feed devices. Fig. 9 is an enlarged perspective view of the magazine with portions of its walls broken away to show the closed gates. Fig. 10 is a sectional view illustrating the coupling of the two parts of the vertical shaft. Fig. 11 is a diametric section of one of the carbon-separating magnets, illustrating the arrangement of the clamp-operating pin and the spring by which it is backed.

The main supporting-frame consists of three pairs of parallel wooden bars, $a$, the bars of each pair connected by suitable cross-bars, and the pairs supported at suitable distances apart by vertical rods $a'$.

The letter A designates a magazine or case for holding a supply of carbon pencils arranged vertically side by side in a single row. The inner end of this magazine is partially open, its two side walls, $b\ b$, curving toward each other, but separated by an intervening space. (See Fig. 6.) At a short distance from these curved ends the side walls of the magazine are slotted more than half-way up from the bottom, as shown at $c$, and through these slots play the spring doors or shutters $d$, between which, when closed, and said curved ends is a space for holding a single carbon pencil and serving as a guide therefor. This space is open at top and bottom. The doors are pivoted at top and bottom to the ends of swinging links $e\ e$, which are at their opposite ends pivoted to arms $e'\ e'$, projecting from the side walls of the magazine. Springs attached to the side walls, as shown at $e^2$, hold the doors up and normally closed. The lower ends of the doors extend below the magazine, and each is provided with a bevel-faced lug, $d'\ d'$, extending somewhat beyond the curved ends of the side walls toward the feed-chain, which will be presently described.

Within the magazine is a follower, $f$, being a plate of proper size to move freely flatwise horizontally in the magazine, and from this plate arms, as shown at $f'$, project through horizontal slots $f^2$ in the side walls. To these arms are attached cords $f^3$, which pass over pulleys $f^4$, supported on brackets $f^5$, attached to the frame-work of the lamp, and a weight, $f^6$, hung upon the loop formed by these cords, tends to draw the follower toward the inner end of the magazine. The carbon pencils being arranged in series between this follower and the doors, the innermost one is constantly pressed against said doors, so that when they are opened it will pass into the space between said doors and the curved ends of the side walls, which prevent its passing farther. After entering this space the pencil is to be driven downward endwise, this being accomplished by the feeding devices, which will now be described.

The letter G indicates the endless feed-chain, which is carried by two chain-wheels, $g\ g'$, fixed upon two arbors, $g^2\ g^3$, journaled between the metallic side bars, $h$ and $h'$, of a sliding frame, H, and respectively near the top and lower end of said frame. The frame H is arranged vertically between the bars $a\ a$ of the top and intermediate pairs of said bars, and slides in guide-recesses formed in said bars, its downward movement being limited by suitable stops, 8 8, projecting over the top bars, $a\ a$.

Two links of the chain G have each outwardly-projecting lugs $g^4\ g^4$, these lugs being arranged at a distance apart equal to the length of one of the carbon pencils. The outer portion of each lug is of proper width and projects sufficiently to enter the space between the two curved ends of the side walls of the magazine and extend nearly to the doors; but the inner portion, $g^6$, is wider and double beveled on its under side, so that at the proper time in the movement of the chain it will strike the lugs $d'$ on the lower ends of the doors $d$, force them and the doors downward, and slip between them as the doors swing outward on the pivoted links.

The frame H, at its lower end, which extends below the intermediate pair of bars, $a$, carries an armature, I, set forward so as to come under the inner end of the magazine, and it has an aperture equal in diameter to that of one of the carbon pencils, directly under the guide-space between the doors and curved ends of the side walls of said magazine.

To the under side of the armature I are pivoted two bent clamping-levers, $i\ i$—one on each side of the aperture—the longer arms of said lever depending and having their facing surfaces provided with grooved seats $i'\ i'$, between which a carbon pencil may be clamped, while their shorter arms extend laterally outward under the armature, their tips coming respectively under two holes in the opposite ends of said armature.

Directly over the opposite ends of the armature I respectively are arranged two electro-magnets, K and K', having coils of comparatively coarse wire. These magnets are supported by brackets attached to the frame-work, and the lower ends of their cores are socketed to receive brass or other neutral pins $k\ k$, the inner ends of which abut against springs in said sockets, while their lower ends project through the holes in the ends of the armature I below, and against the tips of the short arms of the clamping-levers $i\ i$.

The coils of the two magnets K K' are connected by a wire, $k'$. The upper terminal of the magnet K is connected to the incoming line-wire L, and the upper terminal of the magnet K' is connected by a wire, $k^2$, to a metal contact-bracket, $l$, which is secured to but insulated from the metal bar $h$ of frame H.

Pivoted to the rear edges of the bars $h$ and $h'$ respectively are two metallic levers, M and M'. The lever M is pivoted at one end to the bar $h'$, and at its other end carries an armature, $m$, while the lever M' is pivoted near one end to the bar $h$, and at its other end carries an armature, $m'$. At its inner end the lever M' carries a double metallic bracket, $m^2$, the branches of which are provided with adjustable screws, the tips of which stand in the path and on opposite sides of lever M. Said lever M lies normally against the tip of the lower screw, and in this position overbalances the lever M', and makes contact with the contact-bracket $l$, and serves as a conductor connecting said bracket and the magnets K K' with the bar $h'$, to which it is pivoted, said bar, the armature L, and clamping-levers $i$ serving also as conductors conveying the current to the carbon pencil, which may be clamped between said levers.

Immediately over the armature $m$ of lever M is an electro-magnet, N, having a coil of fine wire and much higher resistance than that of the coils of magnets K and K', said magnet N being in a derived circuit around the said magnets K and K'.

Immediately over the armature $m'$ of lever M' is an electro-magnet, N', having a coil of wire similar to that of the coils of magnets K and K', said magnet N' having one terminal of its coil connected with the coil of magnet K' and the opposite terminal connected with the metal bar $h'$ of frame H.

The arbor $g^3$, which carries the lower chain-wheel, also carries a fine-toothed ratchet-wheel, $o$, and an arm, $o'$, loosely pivoted on the arbor, carries a pawl, $o^2$, which takes into the teeth of said wheel, the end of this arm $o'$ being pivoted to the lower end of a rod, $p$, the upper end of which is pivoted to the lever M' between its fulcrum and armature. Said arbor $g^3$ also carries a bevel-gear wheel, $q$, which meshes with a similar wheel, $q'$, on one end of a horizontal shaft, $r$, the other end of which is engaged, by means of bevel-gears, with a vertical shaft, $s$, which has similar engagement with one end of another horizontal shaft, $t$, this shaft carrying at its other end a worm, $t'$, which engages with a worm-wheel, $u'$, on a shaft, $u$, journaled in the bars $a\ a$ of the lower pair of said bars. This shaft $u$ carries a carbon wheel, C', which is arranged in such position under the clamping-levers $i$ that a carbon pencil guided downward between said levers will strike directly upon the top of the periphery of said wheel.

In order to prevent the passage of the incoming current to the carbon wheel by any other route than over the carbon pencil, I form one of the shafts used in transmitting motion to the shaft of said wheel—in the present instance the shaft $s$—of two parts, as at $s'\ s^2$, insulated from each other. The part $s'$ carries a socket-piece, $s^3$, having a squared socket lined with hard rubber or similar insulating material, and in this socket the squared end of the part $s^2$ is inserted snugly.

The operation of the apparatus as now described is as follows: The magazine being filled with carbon pencils in front of the follower, a pencil, C, is placed between the clamping-levers $i\ i$, with its point resting upon the carbon wheel, and another pencil is passed down through the space between the doors of the magazine and the curved ends of its side walls, and rested upon the top of the first pencil. The chain-wheel is then caused to move until one of its lugs rests upon the upper end of the upper pencil, and then the lamp is ready for lighting. When the current is turned on it traverses the coils of magnets K K', engaging said magnets and causing them to attract the armature I and raise the frame H. As this armature rises the spring-pins $k$ press the tips of the clamping levers $i\ i$, causing said levers to clamp the pencil and lift it from the wheel, thus establishing the arc, the metal shaft of the carbon wheel C' being in electrical connection with the outgoing line-wire L'. When in the course of its burning the pencil shortens so as to set up a sufficient resistance, a proper proportion of the current will be caused to pass over the circuit including the magnet N to cause said magnet to attract its armature $m$, and thus break the electrical connection of lever M with the contact-bracket $l$. The main current will then immediately flow over the coil of magnet N', and said magnet will attract its armature $m'$, the lever M' rising and drawing the rod $p$ so as to turn the ratchet-wheel and lower chain-wheel, thus causing the lug of the chain which rests upon the top of the upper pencil to move said pencil downward and press the lower pencil closer to the carbon-wheel. At the same time motion is transmitted from the shaft of the lower chain-wheel, through the shafts and bevel-gear connections heretofore described, to the carbon wheel, causing it to make a partial rotation. When the armature $m'$ rises, the opposite end of lever M' descends, and the upper screw of its double bracket strikes lever M and forces it down in contact with the contact-bracket $l$, thus shunting the current from magnet N'. If the carbon pencil has been fed forward sufficiently, the parts will now remain as they are; but if not the operation of the feeding devices will be repeated until it is. When one pencil is consumed another follows it into place, and as the pencil in the space at the inner end of the magazine is forced therefrom the wide part $g^2$ of the chain-lug $g$ strikes the lugs $d'$ of the doors, moving said doors down and out, so that a fresh carbon pencil is pressed by the follower into said space and into the path of the coming chain-lug, which is to force it downward.
I am aware that a magazine electric lamp has been provided with an endless-chain feed operated mechanically for taking carbons successively from the magazine and moving them toward an opposite electrode, and I lay no claim to such a lamp, broadly.

Having now described my invention, what I claim is—

1. In an electric-arc lamp, the combination, with the magazine provided with devices for discharging single pencils successively therefrom, of the endless chain provided with projections for striking the pencils discharged and forcing them toward the opposite electrode, and suitable devices for operating said chain automatically as the result of increased resistance in the lamp-circuit, substantially as described.

2. The combination, with the magazine provided with the automatically-closing doors and automatic means for discharging the pencils through the doorway, of the endless chain provided with means for opening said doors and driving the discharged pencils forward longitudinally, substantially as described.

3. The magazine provided with the automatically closing doors, means for automatically discharging the pencils, and a guide for a single pencil outside of said doors, substantially as described.

4. The combination, with the magazine provided with a guide for single pencils, and with automatically-closing doors, of the traveling chain provided with means for driving the pencils longitudinally, and automatic devices for opening the doors to permit a fresh pencil to pass, substantially as described.

5. In an electric-arc lamp, the combination, with the electro-magnets for lifting a carbon pencil from an opposite electrode to establish the arc, of an electro-magnet of higher resistance in a derived circuit around said magnets, a feed-operating magnet in a shunt-circuit, and shunting devices operated by said magnet of higher resistance for shunting the main current through said feed-operating magnet, substantially as described.

6. The combination, with the electro-magnets N', arranged in a shunt-circuit for operating the pencil-feed, and the electro-magnet N, of higher resistance, arranged in a derived circuit, of the levers M and M', carrying armatures for such magnets, respectively, a circuit breaking or shunting device operated by the first-named lever to direct the main current over the coil of magnet N', and means for restoring said shunting device to its normal condition by the action of the lever M', substantially as described.

In testimony whereof I affix my signature in presence of two witnesses.

ALENZA T. GIFFORD.

Witnesses:
ANDREW B. SEARLES,
MARION C. HAPPOLDT.